Figure 1:
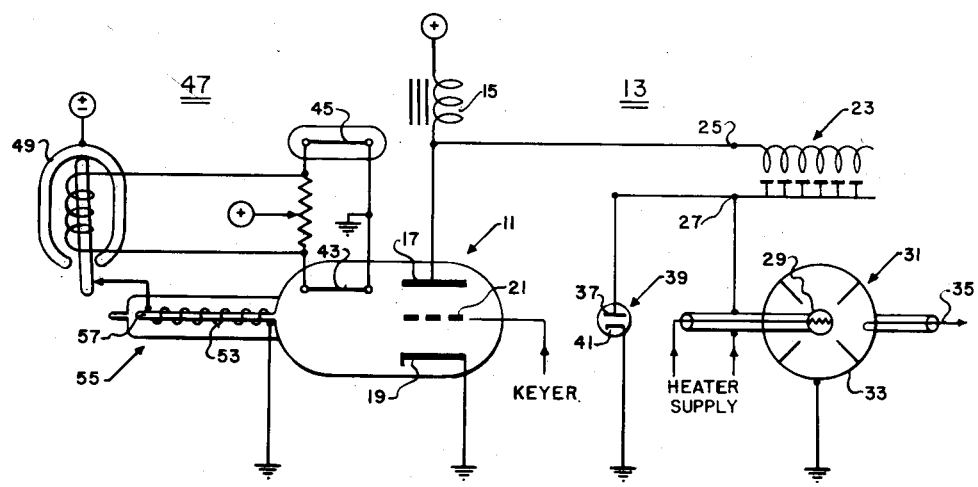

Jan. 15, 1952  J. ROTHSTEIN  2,582,282
GASEOUS DISCHARGE DEVICE
Filed Nov. 3, 1950

*INVENTOR.*
JEROME ROTHSTEIN
BY
Harry M. Saragovitz
*Attorney*

Patented Jan. 15, 1952

2,582,282

UNITED STATES PATENT OFFICE 2,582,282

GASEOUS DISCHARGE DEVICE

Jerome Rothstein, Belmar, N. J., assignor to the United States of America as represented by the Secretary of the Army Application November 3, 1950, Serial No. 193,997

1 Claim. (Cl. 313—174)

(Granted under the act of March 3, 1883, as amended April 30, 1928; 370 O. G. 757)

The invention described herein may be manufactured and used by or for the Government for governmental purposes, without the payment of any royalty thereon.

This invention relates to ionic discharge devices and more particularly to gas reservoirs for overcoming the gas clean-up difficulties of gaseous discharge devices, utilizing such an ionizable medium as hydrogen, as distinguished from vapor discharge devices, utilizing such an ionizable medium as mercury.

Vapor discharge devices have their own reservoir of vapor and are not subject to any clean-up difficulties, but the temperature range for proper operation is rather narrow and deionization time is long. Gaseous discharge devices have a rather wide temperature range for proper operation, but have no inherent reservoir of gas and are subject to clean-up of the gas resulting in shortened operating life of the device. When certain gases are used it has been possible to provide chemical compounds of the gas as a suitable reservoir, and to cause dissociation of enough gas from the compound to maintain the desired gaseous medium. Usually such dissociation is caused by the application of heat either from the gaseous discharge or from a suitably controlled source. For example, solid titanium hydride $TiH_2$ (not the gaseous form $TiH_4$) has been successfully used to supply hydrogen. Certain gases can be absorbed into materials by what is called "occlusion" a term which gradually decreases in significance as actual chemical compounds, however, unstable, are identified as the basis of the action. Inert gases form no compounds whatever and many other gases are not suitable for use in such reservoirs. This situation has greatly hampered the development of gaseous discharge devices.

It is an object of this invention to provide a suitable reservoir for supplying gas to a gaseous discharge device to overcome gas clean-up, this reservoir being based mainly on a physical, not chemical, phenomenon and therefore adaptable to substantially any gaseous medium.

It is a further object of the invention to provide a reservoir which is easily manufactured and not dependent on high purity of the gaseous medium.

The invention may be practiced by providing a thin walled reservoir within, or communicating with, the discharge device, and containing the desired gas at somewhat higher pressure than in the discharge device itself. A heating means adjacent the thin wall of the reservoir is used to heat this thin wall to such a temperature that a suitable amount of the desired gas diffuses into the discharge device. Although such diffusion has been known to scientists for many years as indicated in the article "Admission of pure gases to vacuum systems" by E. L. Jossem, Review of Scientific Instruments, May 1940, vol. 11, pages 165-6, the application of this phenomenon to the problem of gas clean-up has not been recognized.

Figure 2:
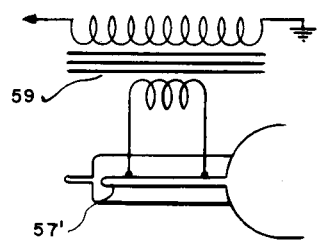

The invention is illustrated in the accompanying drawing showing a thyratron in a suitable circuit and a control circuit for maintaining the desired gaseous medium by proper heating of the thin-walled reservoir of this invention, in Fig. 1, and a modified form of the device in Fig. 2.

In the drawing a thyratron 11 is shown in a simple line pulse modulator circuit 13 as used for radar. A source of positive potential is connected through charging impedance 15 to anode 17 and cathode 19 is grounded. Grid 21 is provided with positive keying pulses from a keyer at appropriate times. In parallel with the anode cathode circuit of the thyratron is the load circuit to be pulsed including a pulse forming line 23 having positive terminal 25 connected to the thyratron anode 15 and negative terminal 27 connected to cathode 29 of a magnetron oscillator 31 having a grounded anode 33 and output R. F. line 35, and to anode 37 of a recharging diode 39 having grounded cathode 41 in parallel with the magnetron. The line 23 involves a substantial distributed capacitance charged by the source of positive potential. When the thyratron conducts, the terminal 25 of the line drops nearly to ground potential and the other terminal 27, which was already near ground potential, provides a very high negative potential to the cathode 29 of magnetron 31 to cause oscillation resulting in a pulse of R. F. energy over line 35. When line 23 is discharged the conduction ceases until it is charged again and a keying pulse is applied. The characteristic of the line is such that the pulse of energy is reasonably uniform during the time required for the abrupt beginning of the pulse to travel the length of the line and return, a form best suited to magnetron operation. As the line is recharged through impedance 15 the accumulation of a positive charge on terminal 27 is prevented by the recharging diode 39.

To determine the variation of gaseous atmosphere within the thyratron 11 as caused by the clean-up phenomenon, a Pirani wire 43 included in the envelope of the thyratron or a chamber connected thereto and a similar wire 45 in another envelope having the desired gaseous atmosphere, but not subject to clean-up, are connected in a bridge circuit 47. Unbalance of this bridge circuit is determined by a magnetic or electronic relay 49, to regulate the operation of heater 53 which determines the effective temperature of reservoir 55.

The reservoir 55 also included in the envelope of thyratron 11 or a chamber connected thereto is designed according to the particular gaseous medium to be used. Basically it includes only a thin diffusion member 57 arranged to be heated by the heater 53, and made of a suitable material, and a filling of the selected gas at a pressure higher than the operating pressure of the thyratron. Depending on the material of the member 57 it is sometimes practical to run the heater current through that member instead of a separate heater. An arrangement of this type is illustrated in Fig. 2 in which the combined diffusion member and heater is designated 57'; ordinarily a transformer 59 is desirable to provide a suitable voltage for such a heater. The diffusion rate is in part dependent on molecular size of the gas and therefore hydrogen, having the smallest molecules, can be diffused through many materials sometimes of substantial thickness while other gases such as nitrogen require thin walls for which fewer materials are suitable. As indicated in the article by Jossem the diffusion rate for metals is determined by the formula $D = k/d R^{1/2} e^{-b/T}$ in which D is diffusion rate, P pressure, T absolute temperature, d thickness, and b and k constants depending on the gas composition and wall material. Chemical phenomena cause certain variations in this formula and in the case of the non-metals a different formula applies. The size of the diffusion member determines the necessary physical strength at the temperature and pressure involved; however for any usual size this involves no serious difficulty. Typical combinations of gas compositions and wall material are indicated in the following table, with a comparative indication of diffusion rates under similar circumstances:

| GAS | Wall | | | | | | | | | | |
|---|---|---|---|---|---|---|---|---|---|---|---|
| | Quartz | Pyrex | Ag | Al | Cr | Cu | Fe | Mo | Ni | Pd | Pt |
| $H_2$ | y | | | 1 | | .4 | 4 | .3 | .7 | 1000 | 6 |
| $D_2$ | | | | | | | | | | | |
| He | .02 | | X | X | X | X | X | X | X | X | X |
| $N_2$ | | | | y | X | | .04 | .00008 | X | | |
| $O_2$ | | | X[5] | | y | | y | | | | |
| Ne | .0006 | | X | X | X | X | X | X | X | X | X |
| CO | | | | | | | .09 | | y | | |

It will be noted that the diffusion rate for hydrogen through palladium is by far the highest while the rates for gases other than hydrogen are very low. The rates marked "X" are immeasurably low while those not marked are unreported and those marked "y" are not reported quantitatively.

The reservoir can be made to any desired size and if necessary can even be replenished. Typical circuits used to illustrate the application of this invention are not essential to the invention per se which may be used in a variety of ways.

What is claimed is:

In combination, a gaseous discharge device containing a predetermined gaseous medium at low pressure, a reservoir connected to said device containing said predetermined gaseous medium at a higher pressure, a diffusion wall between said media, and heating means for said diffusion wall to vary the diffusion rate, whereby clean-up of said low pressure medium by operation of said discharge device may be compensated by operation of said heating means to further supply said medium from said reservoir through said diffusion wall.

JEROME ROTHSTEIN.

REFERENCES CITED

The following references are of record in the file of this patent:

UNITED STATES PATENTS

| Number | Name | Date |
|---|---|---|
| 2,497,911 | Reilly et al. | Feb. 21, 1950 |